UNITED STATES PATENT OFFICE.

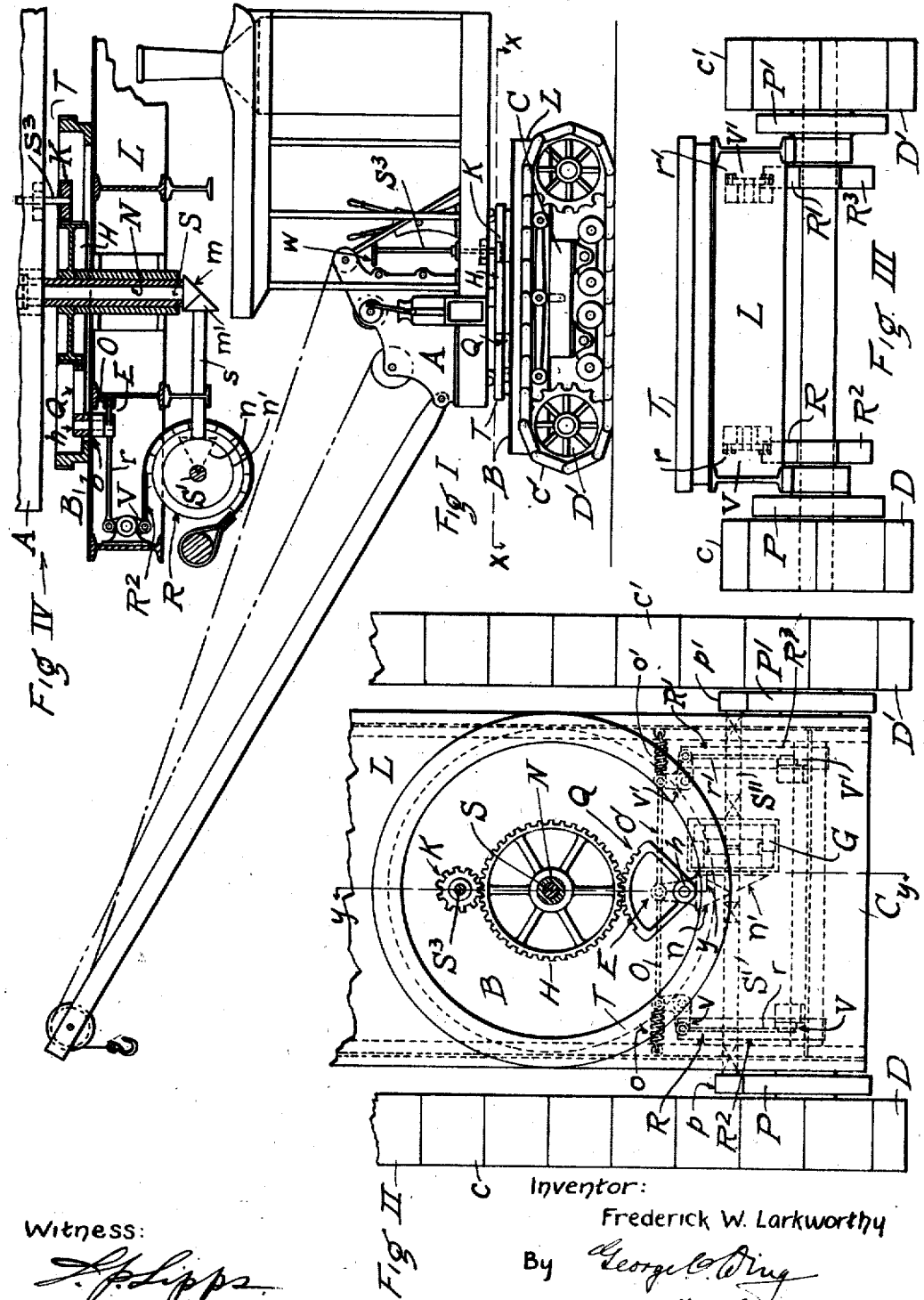

FREDERICK W. LARKWORTHY, OF CLEVELAND, OHIO, ASSIGNOR TO THE BROWN HOISTING MACHINERY COMPANY, OF CLEVELAND, OHIO, A CORPORATION.

MECHANISM FOR STEERING TRACTORS.

1,378,121.   Specification of Letters Patent.   Patented May 17, 1921.

Application filed March 24, 1920. Serial No. 368,331.

*To all whom it may concern:*

Be it known that I, FREDERICK W. LARKWORTHY, a citizen of the United States, residing at the city of Cleveland, in the county of Cuyahoga and State of Ohio, have invented a certain new and useful Mechanism for Steering Tractors, of which the following is a full, clear, and exact description, reference being made to the accompanying drawings, forming a part of the specification, wherein similar parts are designated by the same letters in each case.

The invention relates more particularly to that class of tractors which are carried upon and propelled by so-called endless belt trucks at the sides of the supporting frame or body, and which are designed for surface travel, in contradistinction to those for travel on rails or other specially prepared or fixed trackways. It, furthermore, relates and is limited to such species of said class, as locomotive cranes, steam shovels, and the like, wherein the tractor proper supports and carries a revoluble superstructure and this, in turn, the boom, boom-operating and hoisting and lowering mechanism, the engine, and other chief equipment and parts.

In constructions of the sort, where the course or path of the machine is not already laid out and predetermined, but varies with each occasion and is subject to sudden and frequent deviation and change, the advantage of a steering control within the instant reach of the operator, is well understood, but so far as I know, has not heretofore been definitely conceived and reduced to practice.

It results that, although in some machines, special steering wheels at the front are mechanically directed, the guide-wheels therefor are located remotely from the cab, and, the operator must dismount in order to use the same. In other such machines, there are no special steering devices whatever, and consequently, a change of curve can only be brought about by exterior means or manipulation of one sort or another, which are, generally, improvised, crude and slow.

It is the object of the present invention to provide a mechanical means of steering the class of tractors referred to, which, in some adaptations, shall act upon the steering wheels directly, and, in others, on the driving wheels, in such manner that the latter shall take the place of, and serve as steering wheels, and which, in every form, will bring the steering control to the regular assembly place for the other operating wheels, levers and controlling members.

In the drawings Figure I is a side elevation of a crane comprising said improvement, Fig. II a plan view, on the line $x$ $x$ of Fig. I, of a so-called endless belt truck, showing operative details of the same. Fig. III is an end view of the truck. Fig. IV, a vertical sectional view, in lines $y$, $y$, $y$ in Fig. II.

A represents a locomotive crane, of the revoluble type, mounted upon and adapted to be traversed by an endless belt truck C. In the drawings, said truck has two driving wheels D and D', at each side of the tractor-frame L, treading on rail-circles $c$ and $c'$.

The frame itself is built up into a rectangular structure, of heavy I-beam sections and plates. It carries a bed-plate B, with the usual annular roller-track T firmly affixed to the same. Upon this rests and revolves the superstructure comprehending the engine, fuel-tank, boom, boom-operating mechanism, and controlling levers.

A tubular center-pin or axle N extends downwardly through the superstructure in the usual manner, centrally of said roller track, through the truck-frame L. It contains the truck-driving shaft S which reaches from the engine, on the superstructure, through the pin N to a miter-gear $m$, on its lower end. This gear meshes with a corresponding gear $m'$ on a horizontal shaft $s$, which carries on its other end a bevel gear $n$ in mesh with a like gear $n'$, near the inner end of a transverse shaft S'. The outer end of this latter shaft carries a pinion $p$, which engages the spur-gear P, of the driving wheel D, of the traction-belt $c$, located at the outside of the truck-frame L at that point. A second transverse shaft S" extends, oppositely from, and in alinement with the shaft S', with a corresponding pinion $p'$, at its outer end in engagement with a spur-gear P' of a driving-wheel D' of the traction-belt $c'$ located on the outside of the truck-frame at that point.

A differential or equalizing spur-gear G is loosely mounted on the inner ends of the shafts S' and S" whereby said shafts may be allowed to rotate in unison, or, by means of braking or other suitable means, the rotation of either shaft may be stopped completely or reduced, without affecting the rate of rotation of the other. The equalizing gear G may be of any accepted form or type in use for the function required, and a description of the same is therefore considered unnecessary here. Obviously, by thus producing a difference of rotation between said shafts, and a consequent difference in the forward tendency of the sides of the crane frame, a turning movement around one or the other sides can always be brought about.

As a concrete method of thus regulating the relative rotation of said parts, for the purpose stated, I provide, upon said parts or shafts, brake-wheels R and R' whose bands are anchored, at one end, to the common shaft of the wheels D and D' and, at the other ends, are connected to the lower arms of vertical levers V and V' at the end of the frame.

Horizontal rods $r$ and $r'$ engage the upper lever-arms and extend backwardly to the arms of bell-cranks $v$ and $v'$ whose other arms operatively engage right and left transverse rods O and O' extending to a common lever arm E to be further explained. Springs $o$ and $o'$ are located between the ends of the rods O and O', and the truck frame, to maintain the normal placement of the rods.

Centrally of the roller-track T, above the bed-plate B, a transmission gear-wheel H is loosely mounted around the center-pin N as an axis, and, in a plane, and meshing with its lower face through a predetermined portion thereof a gear-quadrant Q, having a hub $h$ which is extended to serve as an axle, or pivot for the quadrant, is revolubly secured to the bed-plate by the engagement of said hub with an aperture $b$ in the plate for the purpose.

To the lower end of this hub, or axle, is keyed a lever-arm E which pivotally engages the inner extremities of the rods O and O', in order to move the same to the right or left conformably to the movement of the quadrant when actuated by the train of gears of which the quadrant and the loose transmission gear H are members.

In mesh with the upper face of the transmission gear H, above the plane of contact between said gear H and the quadrant, is a pinion K, carried by, and firmly affixed to, the lower end of a vertical shaft $S^3$ loosely mounted in the superstructure of the crane and extending upward from below the same to a point above within reach of the operator. It carries the usual brake-wheel $w$ on its upper end.

The operation of the form of my invention just described, in manifest. The portable locomotive crane to which it pertains when used for road-making, for instance, or for digging or backfilling ditches or trenches, excavating and removing earth for cellars, etc., handling timber, and, loading and unloading coal, sand, gravel in yards, or at sidings, must generally work under conditions which require frequent and quick deviations and turns from straight courses, and in circumscribed spaces. The quality to meet these conditions, it is thought, is imparted to such machines by the mechanism this invention introduces, where the operator without halting the apparatus or leaving his place in the cab, by simply turning the brake-wheel $w$, one way or the other, will thereby correspondingly actuate the pinion K. The spur-gear H, with which said pinion intermeshes, thereupon will transmit the movement to the quadrant Q and the lever-arm E keyed to its hub $h$, which will shift the transverse rods O and O' to the right or the left, as the case may be, and thereby, through the bell-crank $v$ or $v'$, the rods $r$ or $r'$, and the vertical lever V or V', actuate either the brake-band $R^2$ or the brake-band $R^3$, as may be designed. The shaft S', or S'', which severally drive the wheels D and D', and are dominated by said brakes and braking system, will at once be checked, but the movement of the other of the two wheels continuing nevertheless, the crane will respond to the conditions thus brought about, and wheel around the braked-driving wheel side of the crane in a curve corresponding to the degree of braking induced.

Although I have herein illustrated my said invention by a special application of the same which is correspondingly claimed, I do not intend to thereby restrict the patent sought, to such specific form, and I accordingly add claims which are intended to more widely comprehend the inventive idea involved, and to which I am equally entitled to patent protection in the premises.

Having thus described my said invention, what I claim as new and wish to secure by Letters Patent, is:—

1. In a locomotive crane of the endless belt type, having truck wheels, oppositely related horizontal shafts for driving the same, and a differential gear operatively connected to said shafts and to the power mechanism of the crane, the combination, with the superstructure of the crane, of a rotatory steering-shaft extending through the superstructure below the bedplate, a pinion fixedly attached to the lower end of said steering shaft, in mesh with the upper circumferential face of a transmission-gear, revolubly mounted on the bedplate around the axis of revolution of the superstructure; a gear-section axially mounted on said bed-plate in mesh with the lower circumferential face of the transmission gear; an arm on the axle of said gear-section; devices for braking said horizontal shafts, and a system of arms and levers, between said arm and said devices, whereby, according to and by the movement of said arm in one direction or the other, one, or the other, of said devices will be correspondingly actuated, substantially as shown and described.

2. In a locomotive crane of the endless belt type, having truck-wheels, provided with gears, loosely mounted on a common axle, oppositely related horizontal shafts carrying pinions, severally in mesh with said gears, and, a differential gear, operatively connected with the power mechanism of the crane, and with said shafts, the combination, with the superstructure of the crane, of a rotatory steering-shaft extending through the superstructure below the bedplate, a pinion fixedly attached to the lower end of the steering-shaft, in mesh with the upper circumferential face of a transmission gear, revolubly mounted on the bedplate around the axis of revolution of the superstructure; a gear-section axially mounted on said bed-plate in mesh with the lower circumferential face of the transmission gear-section; devices for braking said horizontal shafts, and a system of arms and levers, between said arm and said devices, whereby, according to and by the movement of said arm in one direction or the other, one or the other, of said devices will be correspondingly actuated, substantially as shown and described.

3. In a locomotive crane of the endless belt type, having truck wheels, shafts for independently driving the same, connected by a differential gear, the combination, with the superstructure of the crane, of a rotatory steering-shaft extending through the superstructure below the bed-plate, a pinion, fixedly attached to the lower end of said shaft in mesh with the upper circumferential face of a transmission gear revolubly mounted on the bed-plate around the axis of revolution of the superstructure; a gear-section axially mounted on said bed-plate in mesh with the lower circumferential face of the transmission gear; an arm on the axle of said gear-section; braking devices on the driving shafts of said truck-wheels, and a system of arms and levers between said arm and said devices, whereby, according to and by the movement of said arm in one direction or the other, one or the other of said devices will be correspondingly actuated, substantially as shown and described.

4. In a turntable crane of the endless belt type, having truck wheels, shafts for independently driving the same, and means for braking said shafts, the combination of a horizontal transmission-gear revolubly mounted on the bed-plate of the crane around the axis of revolution of the crane's superstructure, a gear-section on said bed-plate having an axle extending through the same provided with an arm at its lower end, a revoluble steering shaft extending vertically through said superstructure provided with a pinion at its lower end, said pinion being in mesh with the upper circumferential face and said gear-section with the lower circumferential face, of said transmission-gear, and right and left mechanism for severally actuating said means for braking said shafts, in operative engagement with said arm on said axle, substantially as shown and described.

5. In a locomotive crane of the endless belt type, having truck-wheels on oppositely related shafts for driving the same, and devices for braking said shaft when power is applied for the purpose, the combination, with the superstructure of the crane, of a rotatory steering-shaft extending through the superstructure below the bedplate, a pinion fixedly attached to the lower end of said steering-shaft, in mesh with the upper circumferential face of a transmission-gear, revolubly mounted on the bedplate around the axis of revolution of the superstructure; a gear-section axially mounted on said bedplate in mesh with the lower circumferential face of the transmission-gear; an arm on the axle of said gear-section, and a system of arms and levers, between said arm and said devices, whereby, according to and by the movement of said arm in one direction or the other, one or the other, of said devices, will be correspondingly actuated, substantially as shown and described.

In testimony whereof I hereunto subscribe my name at Cleveland, Ohio, the 16th day of March, 1920.

FREDERICK W. LARKWORTHY.

Witnesses:
L. P. LIPPS.,
F. M. CANFIELD.